United States Patent [19]
Bull et al.

[11] Patent Number: 4,710,979
[45] Date of Patent: Dec. 8, 1987

[54] MOTHER'S APRON OR BIB WITH DETACHABLE MULTICOLORED TWO-DIMENSIONAL INFANT TOYS TO AID SUPERVISED BABY PLAY

[76] Inventors: Rebecca L. Bull, 1228 Pennsylvania Ave., LaPorte, Ind. 46350; Kristine A. Shupert, 2334 W. Maple Dr., Union Mills, Ind. 46382

[21] Appl. No.: 903,990

[22] Filed: Sep. 5, 1986

[51] Int. Cl.$^4$ .......................... A41B 13/10; G09B 1/00
[52] U.S. Cl. .......................................... 2/48; 2/49 R; 2/75; 434/170; 434/260
[58] Field of Search ...................... 2/48, 49 R, 46, 115, 2/250, DIG. 6, 75, 80; 434/258, 170, 259, 260; 446/98, 419; 63/20

[56] References Cited

U.S. PATENT DOCUMENTS

| | | | |
|---|---|---|---|
| 1,497,685 | 6/1924 | Hoyme | 2/48 X |
| 2,582,699 | 1/1952 | Jelaso et al. | 446/28 |
| 2,766,454 | 10/1956 | Rice | 2/48 |
| 3,316,669 | 5/1967 | Nachbar | 446/98 X |
| 3,428,962 | 2/1969 | Slimovitz | 2/48 |
| 3,484,974 | 12/1969 | Culmone | 2/115 X |
| 3,566,481 | 3/1971 | Causer | 434/260 |
| 3,638,334 | 2/1972 | Malikowski | 434/260 |
| 3,724,101 | 4/1973 | Slezak | 2/250 X |
| 3,997,982 | 12/1976 | Holland | 434/260 |
| 4,277,848 | 7/1981 | Boehland | 2/115 |
| 4,354,282 | 10/1982 | Langdon | 2/115 |
| 4,519,781 | 5/1985 | Boyd | 434/258 X |
| 4,636,172 | 1/1987 | Fredericks | 434/170 X |
| 4,637,798 | 1/1987 | Maiden-Nesset | 434/260 X |

OTHER PUBLICATIONS

VELCRO Product News No. 43, Mar. 1978, "Wear Me Dress Me Shirt".

Primary Examiner—Louis K. Rimrodt
Assistant Examiner—J. L. Olds
Attorney, Agent, or Firm—A. A. Saffitz

[57] ABSTRACT

A sleeveless, preferably lined, apron of jacket length sewn together at the shoulders having a back panel of about the same length as the front panel with detachable multicolored two-dimensional cut out toys provided on the front so that the mother or babysitter can observe or actively participate in the baby's play involving detaching or reattaching these toys to the front of the apron. Exemplary multicolored toys in the form of two-dimensional detachable appliques are a butterfly, a kitten, a lion, a Noah's Ark, and the letters A, B & C. A toy may include a sounding device, such as a bell which is attached to the butterfly and cannot be detached by the infant. The Noah's Ark is attached by buttons fitting into buttonholes and these are manipulated by the child. The Letters A, B & C each differently colored, match outlines on the apron in the corresponding color, (blue for A, green for B, red for C) to attach by means of VELCRO fasteners (VELCRO is a hook and pile type fastener). A variety of detachment tasks which vary in difficulty are performed by the child while the mother monitors these tasks or may assist the infant in directing the infant to more difficult tasks. Attaching the letters A, B and C to the apron represent a task which can be performed by a six-month old infant and is comparable in principle to the task of attaching the detachable lion's head by the infant. Operating the zipper on the butterfly to uncover a mirror below the zipper is a task performed by an older infant and is of a different character. Manipulation skills involved by opening the zipper or unbuttoning buttons supplement color matching skills and provide a variety of activity which occupy the child and aid in the child's development.

6 Claims, 10 Drawing Figures

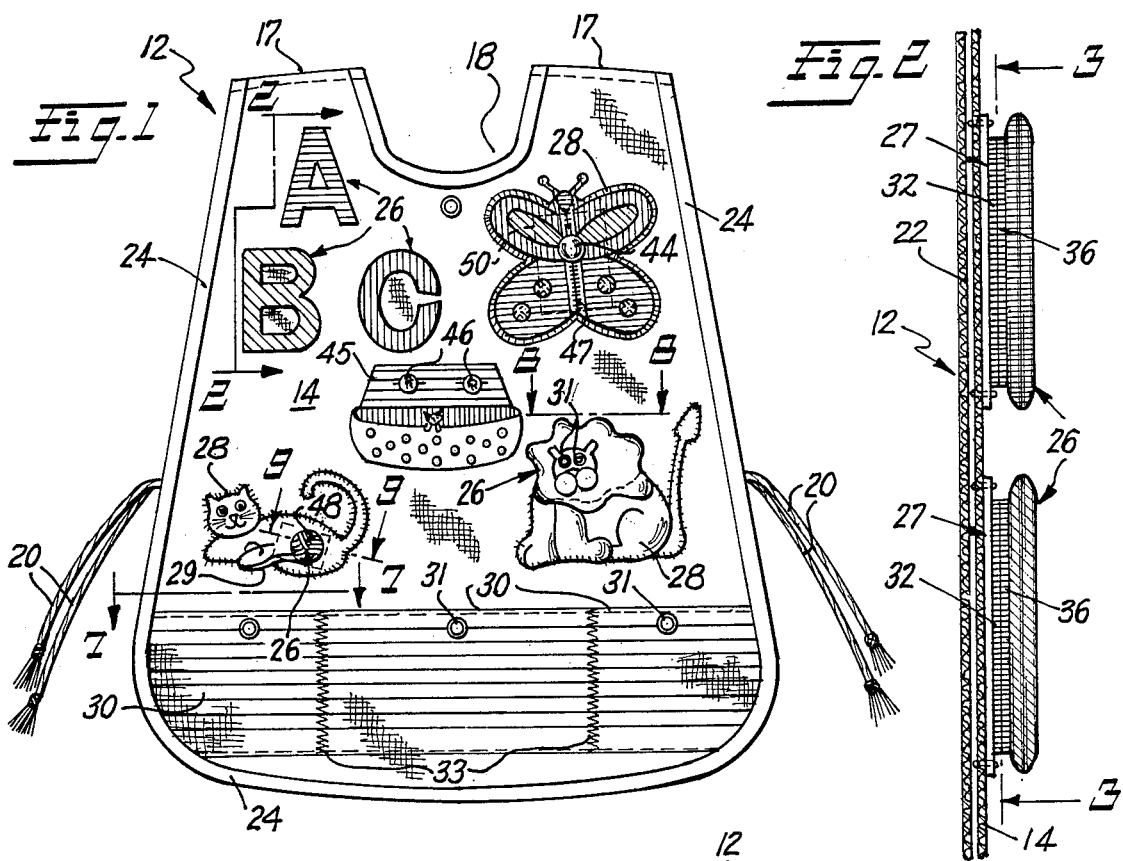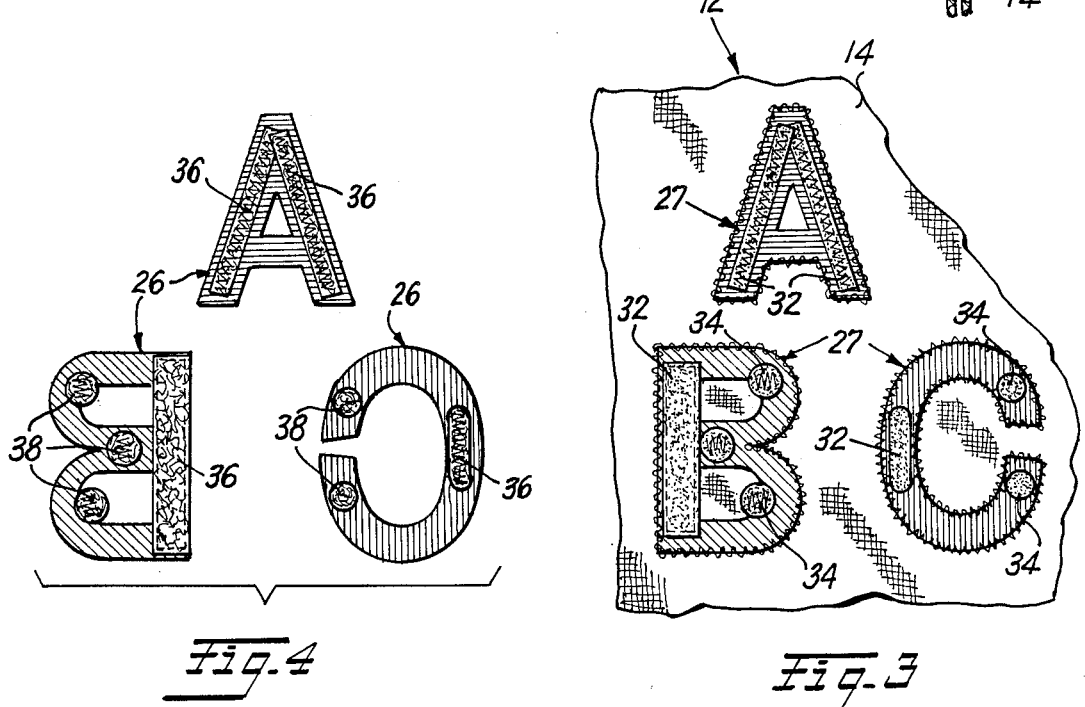

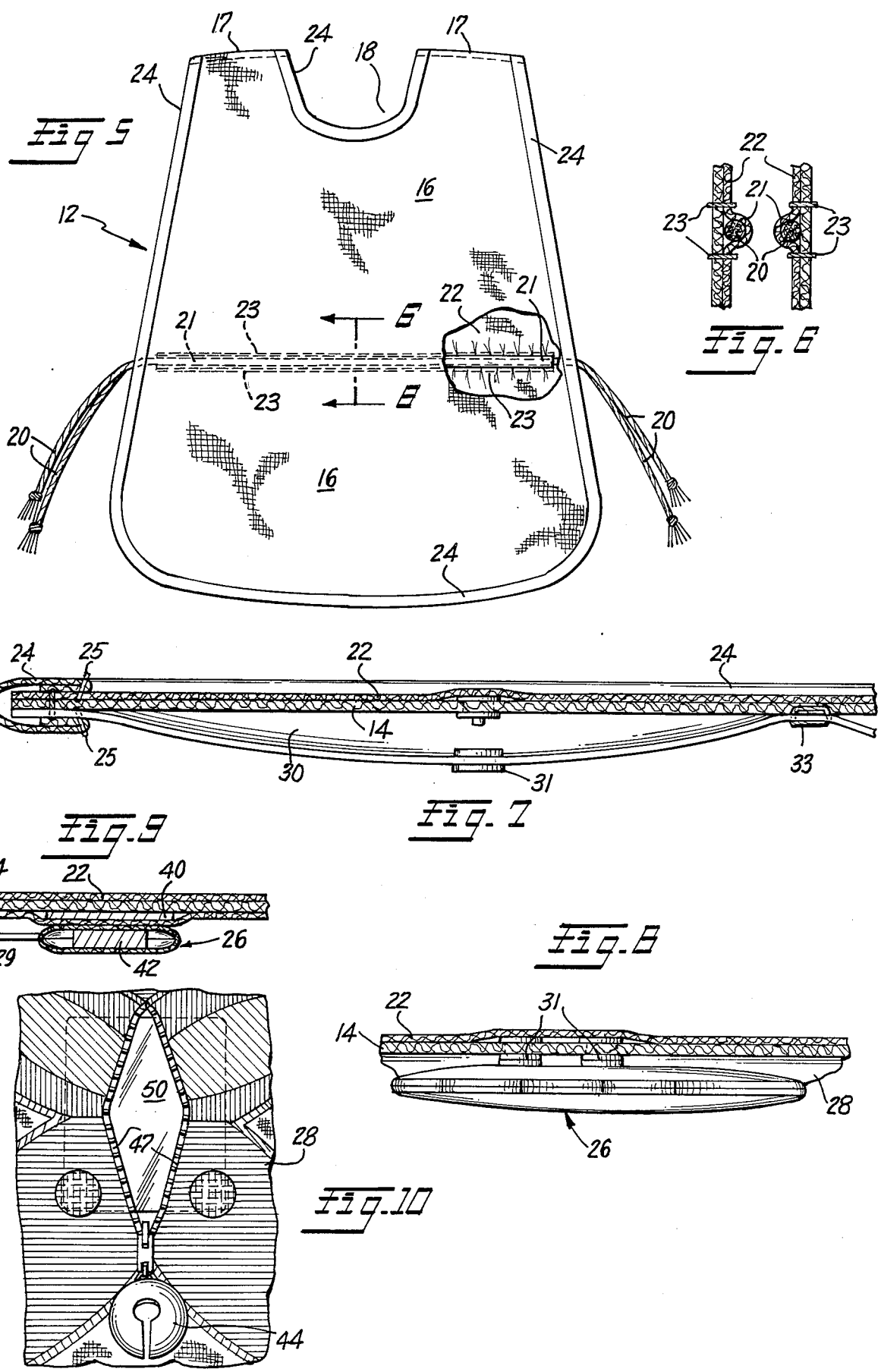

MOTHER'S APRON OR BIB WITH DETACHABLE MULTICOLORED TWO-DIMENSIONAL INFANT TOYS TO AID SUPERVISED BABY PLAY

BACKGROUND OF THE INVENTION

1. Field of the Invention

This invention is in the field of protective clothing, particularly aprons and the like as classified in Class 2, Sub-class 48 and also in the field of teaching aids in the embodiment of an apron having strips of attachment material thereon of the type shown in the patent to Jean A. Beals, U.S. Pat. No. 3,624,686, granted Nov. 30, 1971.

2. Description of the Prior Art

Aprons of full length and of sleeveless style have long been used to protect the clothing of the household worker and an early example of a protective apron which may be sleeveless is found in U.S. Pat. No. 1,555,544, to C. A. Bonoff, granted Oct. 5, 1915, who shows a full length apron which may be sleeveless, and is provided with removable buttons.

Three quarter length aprons of the short sleeve type known as Bungalow Aprons have been shown in the U.S. Pat. No. 1,251,524, to Katherine V. Hogan, granted Jan. 1, 1918, and this style may be piped in the edges around the neck, sleeve and the edges of the belt.

Two-dimensional appliques have been applied to an apron or bib as shown in the U.S. Pat. No. 2,838,758, to Bernard R. Townley, granted June 17, 1958, but this bib is intended to be worn by a child to protect the child's front from being soiled. The applique for this child's bib is in the form of a replica of a two-dimensional lamb which is embossed in the paper material of the bib body by means of a suitable dye which provides an image of the lamb in colored ink. The bib is disposable. The replica of the lamb is of the type which can not be removed by the child who is engaged in a play activity.

Michael A. Taranto in U.S. Pat. No. 3,608,092 granted Sept. 28, 1971, shows an infant's bib having short sleeves, a closing button at the neck and an applique in the front body portion in the form of a half-moon, the applique consisting of two layers of textile material in the outer side of the front of the garment and another layer of textile material at the inner side with a plastic layer between the interior of the front side. This layered construction underlying the half-moon is raised and padded to be three-dimensional and resilient. The edges are bonded by using a heated die. Removal of the half-moon is not possible because of the bonded construction.

Renee M. F. Shackelford in U.S. Pat. No. 2,881,447 shows a disposable paper bib which is die cut at the top to provide strip portions which can be tied behind the neck of the child and a front portion having ornamental printing on the face showing a clown with balloons and a Happy Birthday legend. The bib is used as a party favor for a child's birthday party.

Jean A. Beals in U.S. Pat. No. 3,624,686 granted Nov. 30, 1971, shows an apron comprising ties at the top for attachment around the wearer's waist and a lower body portion having a substantial number of pockets, each pocket being of a different color cloth material and stitched in such a manner that access to each pocket is easily achieved. Each pocket bears strips of colored material corresponding to the color of the pocket. The apron is used for teaching color recognition and is particularly useful for educating individuals having color deficient sight. In the class use of the apron the teacher places articles of a matching color into a pocket while the student observes. There is no participation by the child with respect to the selection of the color or the placement of the strip into the pocket.

John F. Y. Yang in U.S. Pat. No. 3,777,310 granted Dec. 11, 1973, discloses a decorative applique in the form of a toy bear which is applied to a child's bib at the front portion thereof and the applique contains a sounding device which emits an audible sound when the applique is depressed. The bib is particularly helpful to patents during the feeding process by engaging the child who can depress the bear while a spoonfull of food is brought into the child's mouth. In short, the applique keeps the child amused during mealtime and may otherwise occupy the child at times other than mealtime.

The Byron Reid Orr, U.S. Pat. No. 3,871,027, granted Mar. 18, 1975, discloses a disposable absorptive pad formed of impervious material for protecting the clothing of the wearer while burping a baby. The pad is provided with self-adhering pads to aid in attaching it to the clothing. These pads may be pressure sensitive pads or may be fiber engaging pads of the Velcro type.

SUMMARY OF THE INVENTION

In contrast to the non-removable two-dimensional appliques of the Yang U.S. Pat. No. 3,777,310 and the printed applique of Townley, U.S. Pat. No. 2,838,758 or raised three-dimensional applique of Taranto, U.S. Pat. No. 3,608,092, the present invention provides a two-dimensional applique which is solely for the purpose of detachment and reattachment by the infant, there being provided a variety of colors in the attachments constituting the letters of the alphabet, A, B & C to aid in color matching of the applique to its background, a variety of fastening types, e.g. buttons and buttonholes, exemplified by Noah's Ark attachment which requires manipulation by the child of a button through the buttonhole, a two-dimensional animal Figure such as a cat or a lion or an insect Figure such as a butterfly, all of these letter and insect figures being attached by VELCRO fastening means (VELCRO is a hook and pile type fastener) at the bottom and including elements of manipulation such as zipper in the butterfly, a mirror in the butterfly, a ball hidden in the pocket in a cat, and snap fasteners at the neckline of the lion positioned in the area of the head so that the lion's head can be snapped on and off. A group of two-dimensional toys having unique association with the front panel of the apron is provided and the several toys which the child may play with in succession each brings into play a different skill by the child and a stimulus from the toy. The stimulus brought into play from the butterfly toy results from the opening of the zipper. The bell attached to the zipper tab creates a sound. The child's response to the sound can readily be monitored by the mother or babysitter wearing the apron. After unzipping the butterfly center portion a mirror is exposed and the child may respond to the mirror by recognizing the face in the mirror. This is another aspect of the child development which can be monitored by the child's mother.

With respect to the cat applique, a small metal plate is sewn into the cat and a cloth ball which contains a magnet is attached in a pocket provided in the cat. The child may play with the ball and the plate to recognize that there is an attraction between the ball and the plate.

Obviously the play with the cat can occur at a much later stage of development than the play with the butterfly since the recognition of the attraction force is a more advanced kind of recognition in the child.

In the case of the lion the fasteners which are unsnapped to separate the top or lion's head from the body portion require more dexterity than the handling of the buttons in the Noah's Ark.

In the case of the A-B-C's the challenge to the child is one of color matching, the red to the red background, the blue to the blue background, and the green to the green background. The outline in the background conforms to the outline of the letter to which it pertains, thus color is a reinforcement to the child in recognizing the need to bring an outline into conformity to the letter itself.

An important advantage of the invention resides in the possibility of having more than one infant play. The infants may watch each other operating different two-dimensional toys on the garment at the same time or if only one infant or child uses the garment the mother may direct the child towards a particular toy, regardless of the age of the infant. The interaction between mother and infant is very beneficial because the mother or babysitter may take the lead in manipulating or playing with the toy to show the child or infant the manner of playing by way of example. Imitation in play represents a very significant factor in animal development and in child development. It is known, for example, that the primates develop very excellent skills rivaling those of man by imitating the behavior of the mother or other infants.

The construction of the apron in three quarter length from panels joined at the shoulders and neckline permits the orderly arrangement of a significant variety of novel two-dimensional toys because of the substantial length and width provided by the apron. The piping which is provided itself serves in teaching colors to a child since it is in a contrasting color. The cooperation between mother or babysitter and child in managing the toy play activity is believed to be unique since the mother or babysitter encourages the child to open and close the buttons on the Noah's Ark, for example, or to snap and unsnap the fasteners on the lion or to reattach the letters after they are removed. The provision of pockets at the bottom of the apron permits removed toys to be placed in any one of the pockets by the mother or babysitter. The drawstrings at the back of the apron tie in an area which is remote from the baby who is held by the mother or the babysitter in the front. In contradistinction to the passive participation by the child in the use of the colored pocketed apron of Beals, U.S. Pat. No. 3,624,686, the present apron embraces the active participation by the infant or child representing a major play activity incidental to child development which occurs.

BRIEF DESCRIPTION OF THE DRAWINGS

FIG. 1 is a front elevational view of the apron of the present invention, the letters being lined for color for purposes of illustration;

FIG. 2 is an enlarged fragmentary vertical sectional view, through the front panel of the apron showing the padded letters secured thereon by means of hook and pile type fasteners, taken on the line 2—2 of FIG. 1;

FIG. 3 is a fragmentary front view, on a smaller scale, of a portion of the front panel of the apron, with the padded letters removed to show the position of the hook and pile type fastener strips and pads for securing the padded letters thereon, taken on the line 3—3 of FIG. 2;

FIG. 4 is a rear elevational view of the letters, showing the location of the hook and pile type fastener strips and pads which mate with those of FIG. 3;

FIG. 5 is a rear elevational view of the apron with a portion of the rear panel broken away to show the structure for attaching the tying cords of the apron to the front and rear panels;

FIG. 6 is an enlarged fragmentary vertical sectional view, taken on the line 6—6 of FIG. 5, showing the arrangement for securing the cords of the panels of the apron;

FIG. 7 is an enlarged fragmentary horizontal sectional view, taken on the line 7—7 of FIG. 1, showing one of the pockets on the front panel of the apron slightly open;

FIG. 8 is a fragmentary horizontal sectional view, taken on the line 8—8 of FIG. 1, showing the fasteners for the detachable head of the lion;

FIG. 9 is a fragmentary horizontal sectional view, taken on the line 9—9 of FIG. 1, showing the configuration of the cloth ball enclosing a magnet for attraction to a flat plate assembled in the body of an animal.

FIG. 10 is an enlarged fragmentary front view of a representation of a butterfly showing the pocket partially open and a removable mirror therein.

DESCRIPTION OF THE PREFERRED EMBODIMENTS

In FIGS. 1 and 5 the front and back of the apron 12 are shown, the apron being formed of a suitable woven textile material of appropriate weight adapted to the seasons of the year, the front and back having a neck opening 18 where the panels fold along shoulder areas 17, the front panel bearing the plurality of two-dimensional appliques comprising reattachment figures 26 consisting of removable elements in the shape of colored letters A, B and C, the animal Figure 28 having a detachable head portion which is connected and attached to the apron by means of snap fasteners 31, a two-dimensional applique of a Noah's Ark 45, which is also a removable element of the type of the lion's head and the A, B, C's but using a different kind of fastening means, namely, buttons 46 sewn into the front panel 14 of the apron and buttonholes provided for the buttons in the top portion of the Noah's Ark so that they can be manipulated by the baby who exercises its motor and visual skills in this manipulation and in the upper right and lower left corners a two-dimesional butterfly and a two-dimensional representation of a cat, the butterfly being multicolored with design as shown in the drawing and having a zipper down the center axis thereof while the cat figure 28 also has a pocket opening in which is shown a metal plate 40 and in which is placed a cloth ball containing a magnet 42.

The applique of the butterfly in the upper right hand corner of the apron panel 14 and the cat in the lower left hand corner are examples of toys designed to test the child's skills of inquisitiveness and to stimulate the child by encouraging the operations of pulling the zipper 47 which has a bell in the pull tab portion 44 serving as a sounding device which is moved by the baby to create a sound yet is securely attached to the apron thereby developing the visual, motor and hearing skills. In pulling the zipper downwardly the child discovers a mirror 50 which is attached to the body portion of the butterfly by means of a Velcro fastening means. In manipulating the pocket in the two-dimensional applique of the kitten at the lower left hand corner as an example of a fixed figure, the child can move the cloth ball 48 which is held on the tether 29 and bring it close to the metal plate 40 sewn into the kitten so that the magnet 42 will be attracted to the plate 40 and become attached thereto by magnetic forces of attraction. The skill and understanding required in playing with the ball 48, magnet 42 and plate 40 within the cat figure 28 is that which an older child is best equipped to handle. It is a characteristic of the present invention that the placement of the different fixed figures 28 and detachable figures 26 is is selected so that the younger infant between the ages of three-months and one year will be playing with the two-dimensional toys toward the top of the apron, e.g. the multi-colored Noah's Ark, the multi-colored butterfly 28 and the three primary colored A, B, C's.

In FIGS. 2, 3 and 4 the specific construction of the padded primary colored letters A, B and C is shown in relation to the fastening elements and the color outlines in matching colors of these same A, B, C letters which are printed on the face 14 of the aprons. Hook and pile type fastening elements in the shape of strips and pads for each of the letters A, B and C are shown in FIG. 3 in which the back of the letter A has longitudinal strips 32 along the long side of the A and at each side thereof, and by two hook and pile type fastener strips 32 which are adequate to engage similarly placed hook and pile type fastener strips 36 in the outline of the letter A provided on the apron front 14 at the uppermost top portion thereof at the left shoulder. Thus by placing the letter A with hook and pile type fastener strips 32 conforming to hook and pile type fastener strips 36 the detachable letter A is restored to its proper position within the outline of letter A. As shown in both FIGS. 3 and 4, the color hatching for the letter A indicates the primary color blue; for the letter B which is one of the removable elements shown in FIG. 4 bearing the hatching for the color green, the hook and pile type fastener strip 36 which is provided along the entire vertical side of the B matches hook and pile type fastener strip 32 which is secured to the outline of the letter B on the front panel 14 of the apron 12 at the left and below the letter A. Three additional hook and pile type fastener pads 38 are provided on the detachable element element 26 in the form of the letter B and these three pads 38 are located at the top node of B, the bottom node of B and the intersection of the two nodes to mate and register with corresponding pads 34 in the same locations in the outline of the letter B. The outline of the letter B is hatched for green. The child who attaches the letter B within the outline of the green outline and matches the vertical hook and pile type fastener strips 32 and 36 and the pads 34 and 38 will be exercising a skill of registration which depends upon color matching and structural matching at two levels, the first level being the matching of the large B and outline and the second being the matching of the elongated hook and pile type fastener strips 32 and 36 and the circular pads 34 and 38.

Turning now to the manipulation which the child exercises in detaching and reattaching the letter C which is hatched in red in FIGS. 3 and 4, it is seen that the letter C in the detached part removable element 26 is fitted with three pads, the first being elongated pad 36 in the back portion of the C and the other being the two circular pads 38. This removable element 36 is to be reassembled onto the fixed letter in the same red color 27 wherein the corresponding strip of hook and pile type fastening material 32 is provided in the back part of the C and the two circular hook and pile type fastener pads 34 are provided in the open parts of the C.

For fastening the removable elements 26 in the form of A only two elongated hook and pile type fastener strips are required to fasten to corresponding registering strip elements 34 whereas in the curved letters B and C three strips are provided in each of the removable elements 26 and in the fixed receiving elements 27.

It has been the experience of the inventors that their children at ages four to eight months have, based upon their own efforts and experiments, successfully detached and reattached the letters on the apron without having to imitate the behavior of the mother in directing any model play or in demonstrating the attachment so that it can be imitated.

Further, it has been found that the baby can be occupied with this one two-dimensional toy for a period between one and two hours and the mother has used the apron to hold the child in her lap in church and the child has been quiet for the entire church service.

The play which the baby engages in with the other detachable and removable elements such as the Noah's Ark require finger dexterity of opening a button in a buttonhole comes at a more advanced age and the child beyond age six months finds great interest in detaching this toy represented by the Noah's Ark. The detachment by snap fasteners 31 of the head of the lion 28 which is a fixed figure in the portion shown involves a more difficult finger operation by the infant and the operation of this fastener which includes closing the fastener requires the experience and development found in child over a year old. The placement of this more difficult toy figure on the lion 28 with detachable element 26 at the lower part of the apron front 14 adapts the apron to be used for holding a younger and older child at the same time. The older child can play with the two-dimensional figures 28 at the bottom right and left and manipulate the Noah's Ark at the center while the infant can manipulate, attach and reattach, the elements 26 at the top left comprising the A, B, C and the butterfly 28 at the upper right.

In the foregoing discussion and turning to FIG. 1 it is noted that the greater emphasis has been placed thus far on the utilization of the two-dimensional figures with removable elements 26 and with fixed elements 28 as tools for the amusement and development of skills of the infant to occupy the attention span and aid in the development of color matching and hand to eye coordination exercises which are particularly important in the teaching of such tasks as opening and closing a button in a buttonhole or opening and closing a snap fastener or matching form and color in relatively large objects. All of these exercises during play and discovery by the child involving a discipline of returning the toys to their proper storage space and in this respect the apron construction of the present invention provides valuable tools since the A, B, C embodiment shown in FIGS. 1 through 4 requires the child to return the blue A, removable element 26, to its blue A outline on the apron front 14 in order to accomplish the reattachment process. Not only are the skills of alignment and registration exercised but also color matching of the blue of the letter to the blue of the outline and finally the purpose of returning the toy to its proper location is accomplished. Thus with this removable toy as with the Noah's Ark the return to the apron panel 14 is required for both. In the case of the Noah's Ark the manipulation by the child to bring the buttons through the buttonholes and close them requires greater finger dexterity. Nevertheless the same concept of the toys to its proper place is emphasized. Similarly, where the lion's head 26 is returned to the body 28 of the figure by means of the snap fastener 31, a certain degree of strength is required to press the snap fastener in place and this strength must accompany the accuracy in placing the elements of the snap fasteners together which is conditioned further on the perception of the child in aligning the head of the lion to the body so that all three operations in development of the child interact and this is an example which obviously also can take place if a different animal is represented by the toy. To illustrate, the animal could be a horse in which the horse's head could be removed, or an elephant, or a rhinoceros. The principle with respect to the play of the child is the same.

The most sophisticated toy is the one involving magnetism using the cloth ball 48 and the metal plate 40 in which magnet 42 is hidden in the cloth ball and the ball is attached by means of an elastic tether 29. There is a degree of sophistication in this toy which can be tested with young children and can be made into a game with the child. With the construction of the apron there is a possibility which is taken into account that any of the detachable elements 26 such as the lion's head or the Noah's Ark or the letters A, B and C will be dropped on the floor and three pockets 30 are provided at the base of the front panel 14 of the apron. The pockets are stitched along the vertical stitching lines 33 as shown in the drawing of FIG. 1 and the front and back panels 14 and 16 being of equal length and similar width permit the mother or babysitter to put on the apron and to use the ties 20 which pass through loops 21 guided by stitching lines 23 to be drawn around the waist of the wearer. As shown in FIGS. 5 through 9, this center waist tie configuration permits the mother or babysitter adequate room in the pockets for all of the two-dimensional toys after detachment. In the modification which the inventors have made, ¾ length aprons have been created in 30 inch lengths and 20 inch widths adapted to fit all adults. The fabrics which have been used have been denim, corduroy, sailcloth, gingham, rayon, nylon and the like. In the emtodiment shown, the piping 24 is in a contrasting color and the edges have been seamed in a double folded bias. In the embodiment a blue edging was used for small multicolored flowers together with a neutral tan corduroy fabric lined with weaver's cloth.

Having thus disclosed the invention, we claim:

1. In an apron-like garment worn by a mother or babysitter having a front panel, a neck opening, a rear panel and means to tie the garment at the waist of the wearer and further having at least one two-dimensional applique figure for removable attachment and detachment by hook and pile type fastening means by the baby sitting on the lap of the mother or babysitter, that improvement consisting of an additional movable sounding toy which is securely attached to the front of the apron and which is moved by the baby to create a sound, the detachment and reattachment of said applique toy figure developing the visual and motor skills of the baby while the movement and sounding toy developing the visual, motor and hearing skills of the baby; and an additional toy figure in the form of a multicolored cat is secured to the front of said apron, said cat having a pocket, an iron metal plate within said pocket and a tether attached to said cat having a cloth ball surrounding a magnet, the tether permitting the baby to move the ball for attachment to the plate by magnetic forces.

2. An apron-type garment as claimed in claim 1 wherein said sounding toy is a bell which is attached to a zipper pull tab portion and a zipper which is placed in the center of a toy butterfly applique, the pull tab of the zipper being mounted for downward movement to create a sound by said bell.

3. An apron-type garment as claimed in claim 1 wherein said apron-type garment is provided with pockets located at the bottom of the garment which are used for storing any of the removable appliqued toys dropped by the baby.

4. An apron-type garment as claimed in claim 1 including an additional multicolored two-dimensional replica of Noah's Ark and buttonhole means on said Ark, and said apron-type garment has buttons sewn to the front of said garment at locations corresponding to the locations of said buttonholes whereby the baby can button and unbutton the Noah's Ark replica to the front of said panel.

5. An apron-type garment as claimed in claim 1 wherein said replica of a multicolored cat is placed in a lower portion of said apron-type garment and a multicolored butterfly is placed in an upper portion of the front of said apron-type garment.

6. An apron-type garment as claimed in claim 1 wherein said two-dimensional appliqued figure attached by hook and pile type fastening means comprises colored letters of the alphabet of the type of an A, B, C, or a lion or a cat.

* * * * *